(12) United States Patent
Kamada (10) Patent No.: US 9,032,853 B2
(45) Date of Patent: May 19, 2015

(54) CUTTING APPARATUS

(75) Inventor: Teruo Kamada, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 188 days.

(21) Appl. No.: 13/515,373

(22) PCT Filed: Dec. 21, 2010

(86) PCT No.: PCT/JP2010/073051
§ 371 (c)(1),
(2), (4) Date: Jun. 12, 2012

(87) PCT Pub. No.: WO2011/078191
PCT Pub. Date: Jun. 30, 2011

(65) Prior Publication Data
US 2012/0247300 A1    Oct. 4, 2012

(30) Foreign Application Priority Data

Dec. 25, 2009   (JP) ................................ 2009-294130

(51) Int. Cl.
*B21D 28/00* (2006.01)
*B23D 35/00* (2006.01)
*B23D 15/00* (2006.01)
*B21D 28/02* (2006.01)

(52) U.S. Cl.
CPC .............. *B23D 15/002* (2013.01); *B21D 28/02* (2013.01); *B23D 35/008* (2013.01)

(58) Field of Classification Search
USPC .................. 83/531–541, 553, 561–564, 682, 83/694–696
See application file for complete search history.

(56) References Cited

FOREIGN PATENT DOCUMENTS

| EP | 0124746 A1 | * 11/1984 |
|---|---|---|
| GB | 1478789 | 7/1977 |
| JP | 03-184641 | 8/1991 |
| JP | 3-248722 | 11/1991 |
| JP | 2000-061547 | 2/2000 |
| JP | 2000-135523 | 5/2000 |
| JP | 2009-262175 | 11/2009 |

OTHER PUBLICATIONS

A full translation of JP 3-184641 (Aug. 12, 1991).*

* cited by examiner

*Primary Examiner* — Stephen Choi
(74) *Attorney, Agent, or Firm* — Rankin, Hill & Clark LLP (57) ABSTRACT

A cutting apparatus is provided with a first blade (48, 82), a second blade (50, 84) intersecting with the first blade (48, 82), and a switching unit (72). The switching unit (72) switches between a first mode and a second mode. In the first mode, the first blade (48, 82) positions in a cutting position in which it is possible to cut a work-piece (12) and the second blade (50, 84) positions in a non-cutting position in which it is impossible to cut the work-piece (12). In the second mode, the second blade (50, 84) positions in the cutting position in which it is possible to cut the work-piece (12) and the first blade (48, 82) positions in the non-cutting position in which it is impossible to cut the work-piece (12).

5 Claims, 8 Drawing Sheets

FIG. 8 ions in the cutting position in which it is possible to cut the work-piece and the first blade positions in the non-cutting position in which it is impossible to cut the work-piece.

CUTTING APPARATUS

TECHNICAL FIELD

The present invention relates to a cutting apparatus that has a plurality of blades for cutting a work-piece.

BACKGROUND ART

Conventionally, a blanking apparatus in which a blade is provided in a die and a plate is cut into a predetermined shape by pressing the plate using the die is known.

In the blanking apparatus, for example, when the plate has a plurality of shapes to be cut (cutting lines), a blade having the same shape as that of the plurality of cutting lines is provided in the die such that the blanking apparatus cuts the plurality of cutting lines by a single pressing operation.

However, when the cutting lines exist in a wide range of the plate, that is, when the intervals between the cutting lines are large, a size of the entire blanking apparatus may be increased due to an increased size of the die.

As a countermeasure against an increasing the size of the entire blanking apparatus for cutting a plate into a plurality of blank shapes, it is disclosed (refer Patent Document 1) that blades each corresponding to the shape of each blank shape is provided in a press machine such that the blades are spaced apart from each other, and the blades provided in the press machine are configured so as to be displaceable between a cutting position in which the plate is cut and a non-cutting position in which the plate is not cut so that intervals between respective blades are to be narrower than intervals between respective blank shapes, thereby enabling to decrease the size of the entire blanking apparatus (refer to Patent Document 1).

In the apparatus of Patent Document 1, the blades are provided in the press machine in a state in which the respective blades corresponding to the respective blank shapes are spaced apart from each other. In other words, the respective blades provided in the press machine do not intersect with each other. Therefore, a predetermined gap is formed between respective blades. As a result, the size of the entire blanking apparatus might not be sufficiently decreased.

Patent Document 1: JP-A-03-248722

SUMMARY OF INVENTION

One or more embodiments of the present invention provide a cutting apparatus, a size of which can be reduced further.

In accordance with one or more embodiments of the invention, a cutting apparatus is provided with a first blade, a second blade intersecting with the first blade, and a switching unit adapted to conduct a switching between a first mode in which the first blade positions in a cutting position in which it is possible to cut a work-piece and the second blade positions in a non-cutting position in which it is impossible to cut the work-piece and second mode in which the second blade positions in the cutting position in which it is possible to cut the work-piece and the first blade positions in the non-cutting position in which it is impossible to cut the work-piece.

Other aspects and advantages of the invention will be apparent from the following description, the drawings and the claims.

DETAILED DESCRIPTION OF EMBODIMENTS

Hereinafter, an exemplary embodiment of a cutting apparatus according to the invention is illustrated and described in detail in conjunction with the accompanying drawings.

A cutting apparatus according to an exemplary embodiment is configured as a so-called blanking apparatus, and is an apparatus for cutting a work-piece into a predetermined shape.

Figure 1:
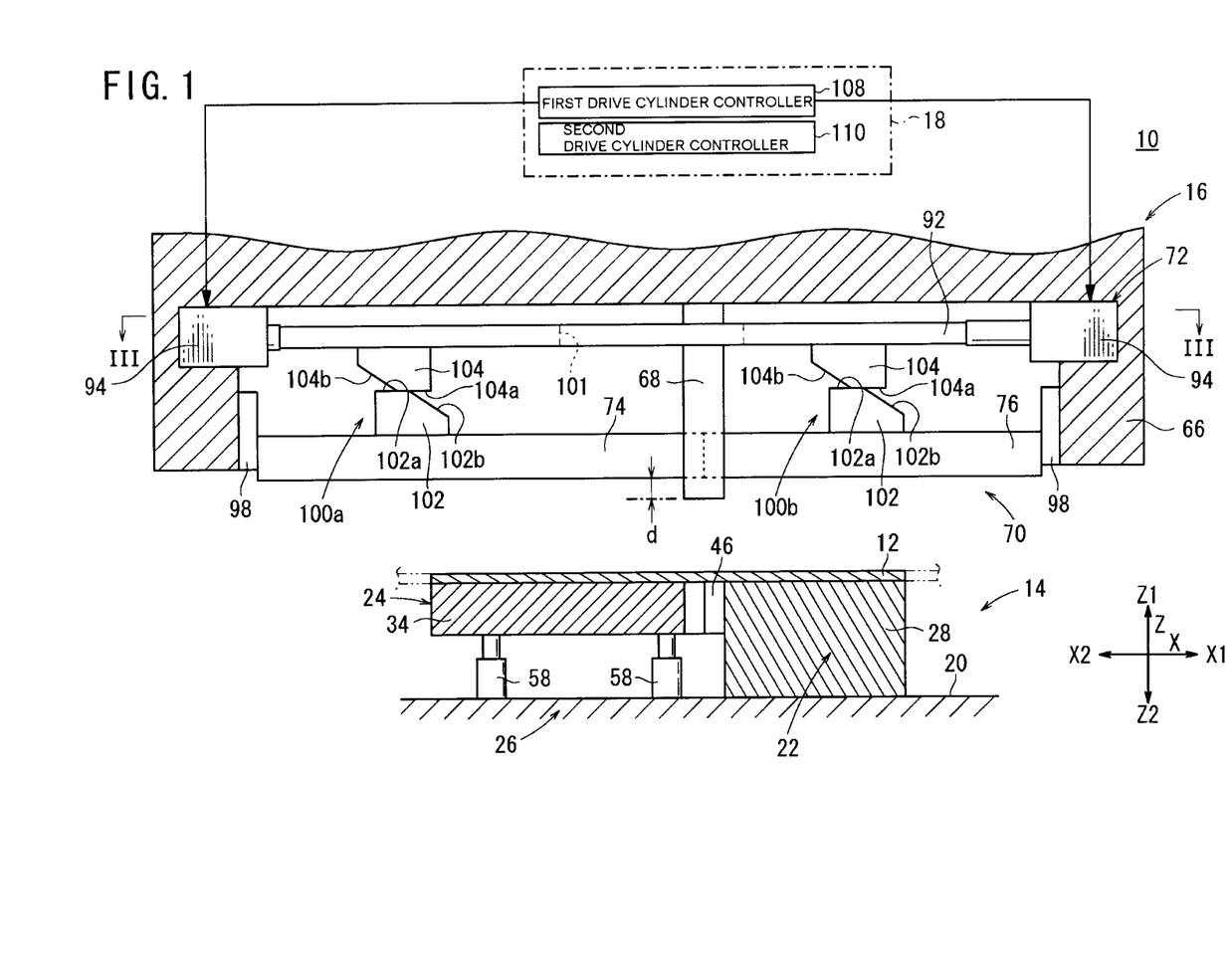
FIG. 1 is a schematic cross-sectional view taken in an X direction of a cutting apparatus according to an exemplary embodiment of the invention.
Figure 2:
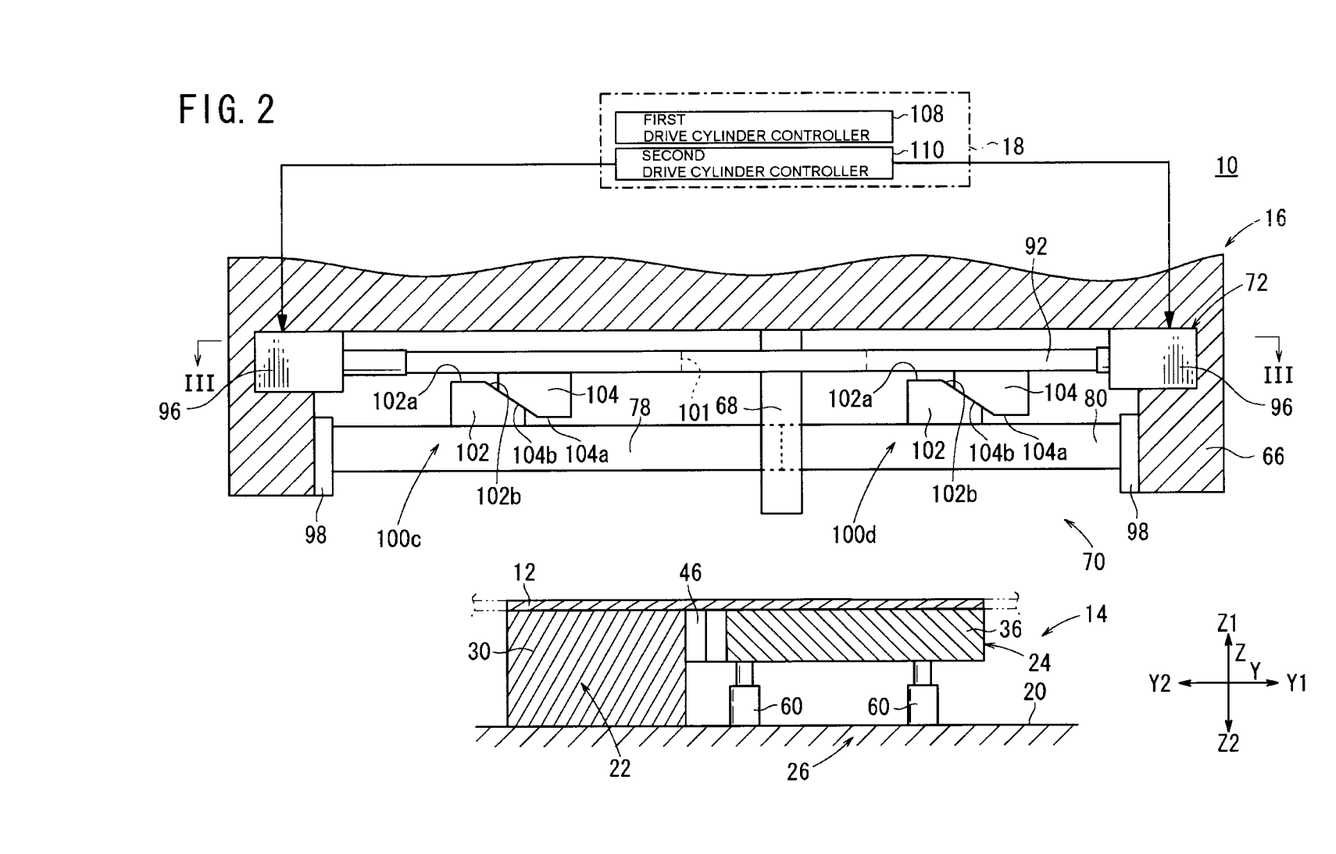
FIG. 2 is a schematic cross-sectional view taken in a Y direction of the cutting apparatus according to an exemplary embodiment of the invention.

As shown in FIG. 1 and FIG. 2, a cutting apparatus 10 includes a lower die 14 on which a plate 12 as a work-piece carried by rollers (not shown) is mounted, an upper die 16 which approach to and retreat from the lower die 14, and a controller 18.

The lower die 14 includes a fixing section 22 fixed on a placing surface 20, a movable section 24 which is movable in a direction in which the upper die 16 moves (Z direction), and a motion support section 26 which displaceably supports the movable section 24.

Figure 4A:
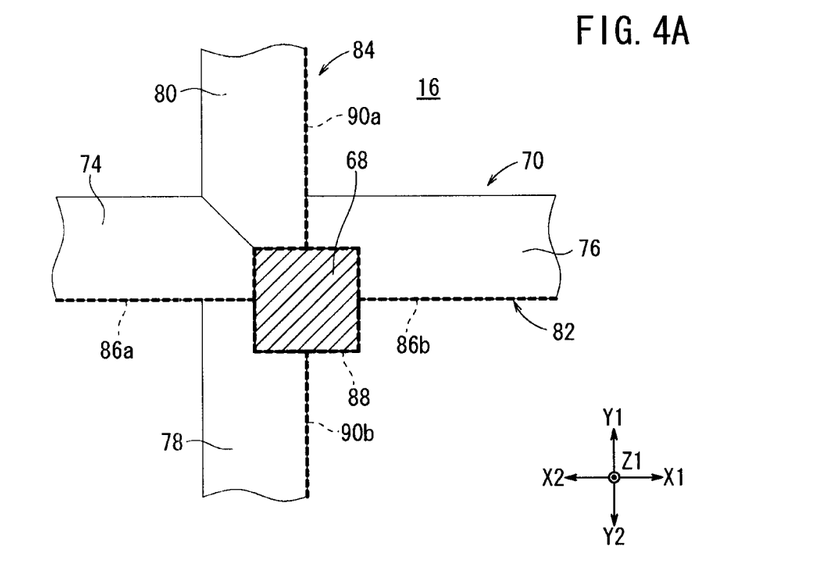
FIG. 4A is a conceptual view of a punching section and a moving section when viewed from above.
Figure 4B:
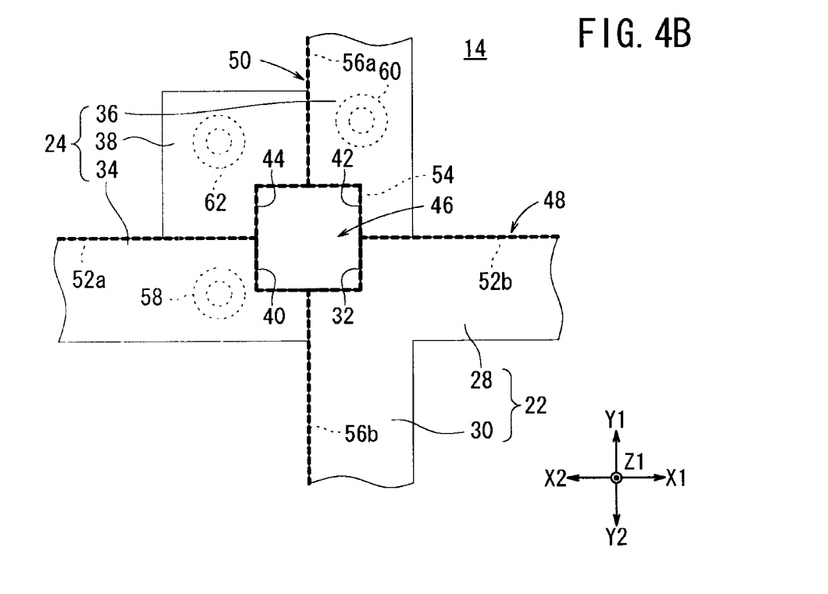
FIG. 4B is a conceptual view of a fixing section and the moving section when viewed from above.

As shown in FIG. 1, FIG. 2, and FIG. 4B, the fixing section 22 includes a first fixing section 28 which extends in a direction (X direction) perpendicular to the Z direction, and a second fixing section 30 which extends in a direction (Y direction) perpendicular to the X direction and to the Z direction and is integrally formed with the first fixing section 28. A fixing section-side notch 32 is formed on an interface between the first and second fixing sections 28 and 30 (see FIG. 4B).

The movable section 24 includes a first movable section 34 which extends in the X direction in contact with the second fixing section 30, a second movable section 36 which extends in the Y direction in contact with the first fixing section 28, and a third movable section 38 which is in contact with the first and second movable sections 34 and 36.

As shown in FIG. 4B, an L-shaped first notch 40 is formed in a portion of the first movable section 34 that is opposite the second movable section 36, a second notch 42 is formed in a portion of the second movable section 36 that is opposite the first movable section 34, a third notch 44 is formed in a portion of the third movable section 38 that is opposite the fixing section 22. Thus, a combination of the fixing section-side notch 32 and the first to third notches 40, 42 and 44 forms a rectangular through-hole 46 therein when seen in a plan view in the Z direction (see FIG. 1 and FIG. 2).

In addition, a first lower blade 48 and a second lower blade 50 which intersects the first lower blade 48 are provided on one end of the fixing section 22 and on one end of the movable section 24 that are adjacent to the upper die 16 (Z1 side).

Specifically, the first lower blade 48 includes a pair of first divided lower blades 52a and 52b which extend in the X direction, and a common lower blade 54 which connects the first divided lower blades 52a and 52b to each other. The first divided lower blade 52a positions on a corner of the first movable section 34 that is adjacent to the third movable section 38 (Y1 side), and the first divided lower blade 52b positions on a corner of the first fixing section 28 that is adjacent to the second movable section 36. In addition, the common lower blade 54 positions on the upper end of the fixing section-side notch 32 and the first to third notches 40, 42 and 44.

The second lower blade 50 includes a pair of second divided lower blades 56a and 56b which extend in the Y direction, and a common lower blade 54. That is, the common lower blade 54 belongs to both the first lower blade 48 and the second lower blade 50, and positions at the point where the first lower blade 48 and the second lower blade 50 intersect with each other. The second divided lower blade 56a positions on a corner of the second movable section 36 that is adjacent to the third movable section 38 (X2 side), and the second divided lower blade 56b positions on a corner of the second fixing section 30 that is adjacent to the first movable section 34.

As shown in FIG. 1, FIG. 2 and FIG. 4B, the movable support 26 includes a first air cylinder 58 provided on the first movable section 34, a second air cylinder 60 provided on the second movable section 36, and a third air cylinder 62 provided on the third movable section 38.

Figure 3:
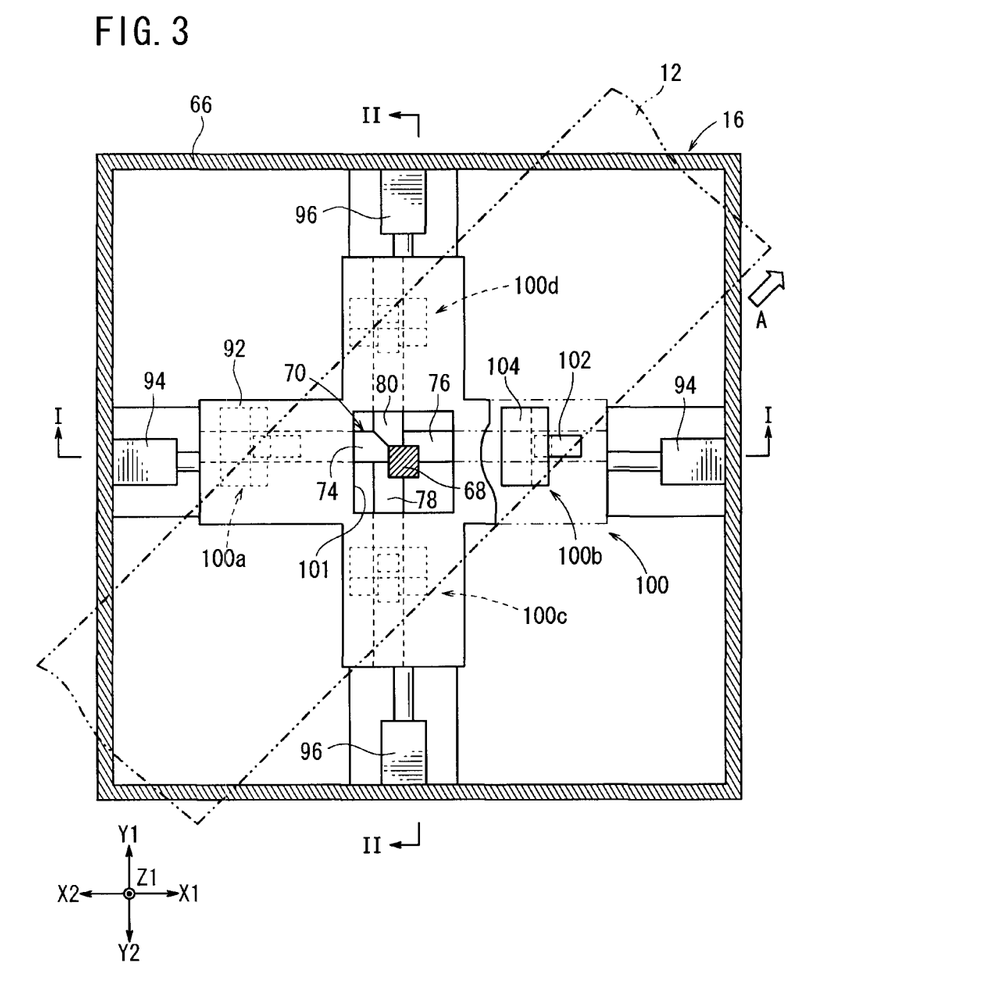
FIG. 3 is a schematic cross-sectional view taken along line III-III of FIG. 1 and FIG. 2.

As shown in FIG. 1, FIG. 2 and FIG. 3, the upper die 16 includes an upper die body 66 which is to be displaced by a press mechanism (not shown) in the Z direction, a punch section 68 which is provided substantially in the central portion of the upper die body 66, a moving section 70 which is movable in the Z direction in contact with the punch section 68, and a moving mechanism 72 which serves as a switching unit to move the moving section 70 in the Z direction.

As shown in FIG. to FIG. 4A, the punch section 68 has a rectangular cross-sectional shape that extends in the Z direction, and is configured such that the punch section 68 can be fitted into the through-hole 46 of the lower die 14.

The moving section 70 includes a first moving section 74 and a second moving section 76, each of which has substantially a rectangular cross-sectional shape that extends in the X direction, and a third moving section 78 and a fourth moving section 80, each of which has substantially a rectangular cross-sectional shape and extends in the Y direction. In addition, the first moving section 74 and the second moving section 76 are arranged in parallel in the X direction, with the punch section 68 being disposed therebetween, and the third moving section 78 and the fourth moving section 80 are in the Y direction, with the punch section 68 being disposed therebetween. That is, the first to fourth movable sections 74, 76, 78 and 80 are arranged so as not to overlap each other in the Z direction.

As shown in FIG. 4A, the first upper blade 82 and the second upper blade 84 which intersects with the first upper blade 82 are provided on one end of the moving section 70 that is adjacent to the lower die 14 (Z2 side).

Specifically, the first upper blade 82 includes a pair of first divided upper blades 86a and 86b which extend in the X direction, and a common upper blade 88 which connects the first divided upper blades 86a and 86b to each other. The first divided upper blade 86a positions on a corner of the first moving section 74 that is adjacent to the third moving section 78 (Y2 side), and the first divided upper blade 86b positions on a corner of the second moving section 76 that is adjacent to the third moving section 78. In addition, the common upper blade 88 positions on an edge of the lower end surface of the punch section 68.

The first upper blade 84 includes a pair of second divided upper blades 90a and 90b which extend in the Y direction, and a common upper blade 88 which connects the second divided upper blades 90a and 90b to each other. That is, the common upper blade 88 belongs to both the first upper blade 82 and the second upper blade 84, and positions at the point where the first upper blade 82 and the second upper blade 84 intersect with each other. The second divided upper blade 90a positions on a corner of the fourth moving section 80 that is adjacent to the second moving section 76 (X1 side), and the second divided upper blade 90b positions on a corner of the third moving section 78 that is adjacent to the second moving section 76.

As can be understood from the above described explanations with reference to FIG. 4A and FIG. 4B, the first lower blade 48 corresponds to the first upper blade 82, and the second lower blade 50 corresponds to the second upper blade 84. Therefore, in some cases, the first lower blade 48 and the first upper blade 82 are collectively referred to as first blades 48 and 82, and the second lower blade 50 and the second upper blade 84 are collectively referred to as second blades 50 and 84.

Likewise, the common lower blade 54 corresponds to the common upper blade 88, the first divided lower blades 52a and 52b correspond to the first divided upper blades 86a and 86b, and the second divided lower blades 56a and 56b correspond to the second divided upper blades 90a and 90b. Therefore, in some cases, the first divided lower blades 52a and 52b and the first divided upper blades 86a and 86b are collectively referred to as first diving blades 52 and 86, and the second divided lower blades 56a and 56b and the second divided upper blades 90a and 90b are collectively referred to as second divided blades 56 and 90.

As shown in FIG. 1 to FIG. 3, the moving mechanism 72 includes a slide plate 92 which is provided so as to cover a portion of the moving section 70 from above, a pair of first drive cylinders 94 which moves the slide plate 90 in the X direction, a pair of second drive cylinders 96 which moves the slide plate 92 in the Y direction, a guide section 98 (see FIG. 1 and FIG. 2) which urges the movable plate 70 toward the slide plate 92 while guiding the movable plate 70 in the Z direction, and a displacement-regulating member 100 which regulates the moving section 70 from being displaced toward the slide plate 92.

The slide plate 92 is substantially cross-shaped when seen in a plan view, and has a rectangular opening 101 in the central portion thereof. A punch section 68 is fitted into the opening 101 so as to extend through the opening 101. The size of the opening 101 is set such that the interval between the punch section 68 and the slide plate 92 is greater than the slide width (movement width) of the slide plate 92. In the meantime, the shape of the opening 101 is not necessarily limited to the rectangular shape but can be properly changed.

As shown in FIG. 1 and FIG. 3, a pair of first drive cylinders 94 is arranged on the upper die body 66 such that the first drive cylinders 94 face each other. This configuration makes it possible to slide the slide plate 92 in the X direction, for example, by increasing the stroke of one of the first drive cylinders 94 while decreasing the stroke of the other one of the first drive cylinders 94.

As shown in FIG. 2 and FIG. 3, a pair of second drive cylinders 96 is arranged on the upper die body 66 such that second drive cylinders 96 face each other. This configuration makes it possible to slide the slide plate 92 in the Y direction, for example, by increasing the stroke of one of the second drive cylinders 96 while decreasing the stroke of the other one of the second drive cylinders 96.

As shown in FIG. 1 and FIG. 2, the guide section is fixed to the upper die body 66, and urges the moving section toward the slide plate 92 using, for example, a spring or the like.

As shown in FIG. 1 to FIG. 3, the displacement-regulating member 100 includes a first displacement-regulating section 100a which is provided on the first moving section 74, a second displacement-regulating section 100b which is provided on the second moving section 76, a third displacement-regulating section 100c which is provided on the third moving section 78, and a fourth displacement-regulating section 100d which is provided on the fourth moving section 80.

Each of the first to fourth displacement-regulating sections 100a to 100d is provided with a first engaging member 102 which is fixed to the upper surface of the moving section 70, and a second engaging member 104 which is fixed to the lower surface of the slide plate 92 so as to face the first engaging member 102. The width of the second engaging member 104 is set to be greater than that of the first engaging member 102 (see FIG. 3).

As shown in FIG. 1 and FIG. 2, the first engaging member 102 is provided with a flat surface 102a which faces the upper surface of the moving section 70, and a first inclined surface 102b which is inclined in the direction in which the moving section 70 extends with respect to the first flat surface 102a. That is, in the first and second replacement-regulating sections 100a and 100b, the first inclined surface 102b is inclined in the X direction (see FIG. 1), and in the third and fourth displacement-regulating sections 100c and 100d, the first inclined surface 102b is inclined in the Y direction (see FIG. 2).

The second engaging member 104 is provided with a second flat surface 104a which faces the upper surface of the moving section 70 and can be in contact with the first flat surface 102a, and a second inclined surface 104b which is inclined in the direction the same as the direction in which the first inclined surface 102b is inclined. The degree of inclination of the first inclined surface 102b and the degree of inclination of the second inclined surface 104b are set substantially the same.

The controller 18 is provided with a first drive cylinder controller 108 and a second drive cylinder controller 110.

The first drive cylinder controller 108 drives the first drive cylinder 94, thereby moving the slide plate 92 in the X direction.

The second drive cylinder controller 110 drives the second drive cylinder 96, thereby moving the slide plate 92 in the Y direction.

Figure 5:
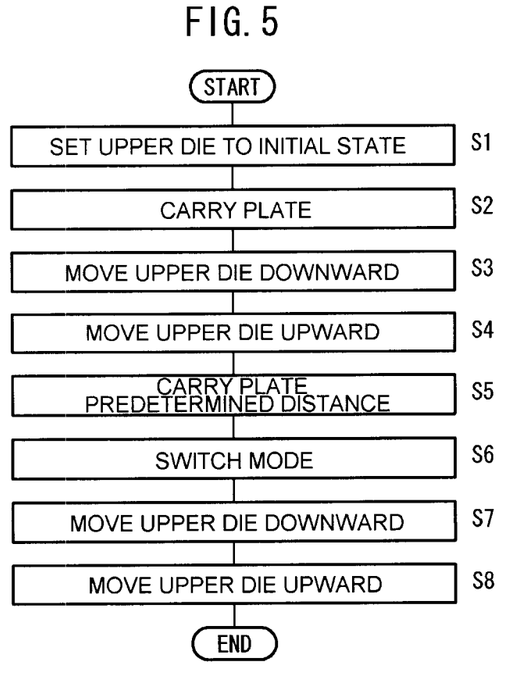
FIG. 5 is a flowchart showing the sequence of cutting a plate using the cutting apparatus according to an exemplary embodiment of the invention.

A description will be given below of the sequence of cutting the plate 12 using the cutting apparatus according to an exemplary embodiment, with reference to the flowchart of FIG. 5.

First, the controller 18 sets the upper die 16 to the initial state (step S1). In the initial state, the upper die 16 is standing by above the lower die 14. In the first and second displacement-regulating sections 100a and 100b, the first flat surface 102a and the second flat surface 104a are in contact with each other. In the third and fourth displacement-regulating sections 100c and 100d, the first inclined surface 102b and the second inclined surface 10b are in contact with each other (see FIG. 1 and FIG. 2).

Figure 6A:
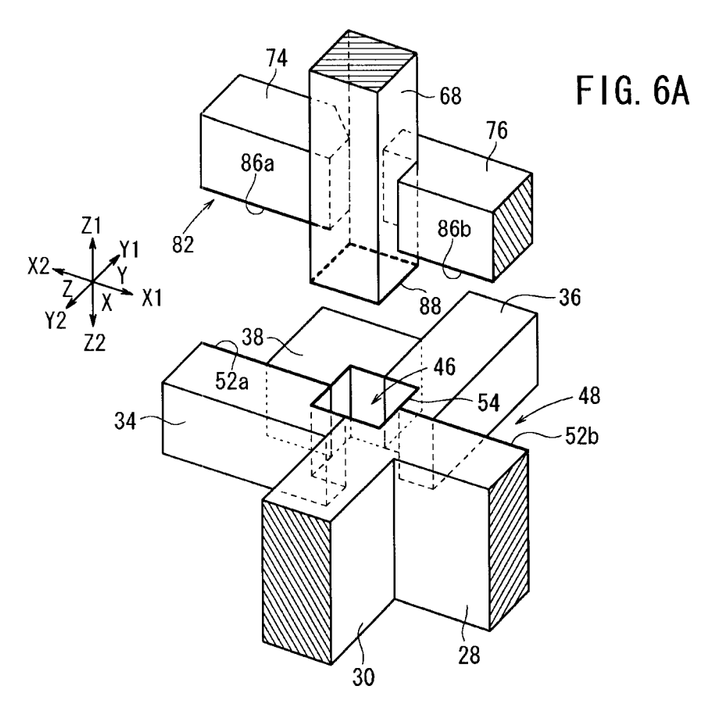
FIG. 6A is an explanatory view showing the positional relation between a first upper blade and a first lower blade before a plate is cut.

Specifically, as shown in FIG. 1, FIG. 2, and FIG. 6A, the first and second moving sections 74 and 76 are positioned below (Z2 direction) the third and fourth moving sections 78 and 80. In other words, the first upper blade 82 positions to be lower (Z2 direction) than the second upper blade 84. The third and fourth moving sections 78 and 80 are not shown in FIG. 6A. In this state, the position of the first upper blade 82 is referred to as the cutting position, and the position of the second upper blade 84 is referred to as the non-cutting position. In some cases, this state is referred to as first mode, and the state in which the first upper blade 82 is disposed in the non-cutting position and the second upper blade 84 is disposed in the cutting position (the state opposite the first mode) is referred to as second mode.

In the meantime, in the first mode, the upper die 16 is set such that the leading end (the common upper blade 88) of the punch section 68 positions toward Z2 than the first upper blade 82 positions. That is, in the first mode, the punch section 68 protrudes a predetermined length in the Z2 direction more than the second and third moving sections 74 and 76. The length of protrusion "d" of the punch section 68 is set so as to be greater than the thickness of the plate 12 (see FIG. 1). This is the same also in the second mode.

In sequence, the plate 12 is carried so as to be placed on the upper surface of the fixing section 22 and the movable section 24 (step S2). Here, as can be seen from FIG. 3, the direction in which the plate 12 is carried (arrow A in the figure) is inclined at 45° with respect to the X1 direction and Y1 direction.

Then, the controller 18 drives the press mechanism so as to move the upper die 16 downward (step S3). Due to this, a first cutting line C1 of the plate 12 is cut (see FIG. 8). Here, the cutting of the first cutting line C1 of the plate 12 is described in detail.

First, when the upper die 16 is moved downward, the common upper blade 88 of the punch section 68 is brought into contact with the upper surface of the plate 12, which is disposed on the upper surface of the fixing section 22 and the movable section 24. In addition, when the upper die 16 is moved downward further, the plate 12 is subjected to a cutting force, since a pressing force of the common upper blade 88 and a repulsive force of the common lower blade 54 act thereon.

As a result, the plate 12 is punched into the shape of a rectangle. After the plate 12 is punched into the shape of a rectangle, the punch section 68 is inserted into the through-hole 46 and, at the same time, the first divided upper blades 86a and 86b are brought into contact with the upper surface of the plate 12. Here, the first moving section 74 positions above the third movable section 38, and the second moving section 76 positions above the second movable section 36.

Figure 6B:
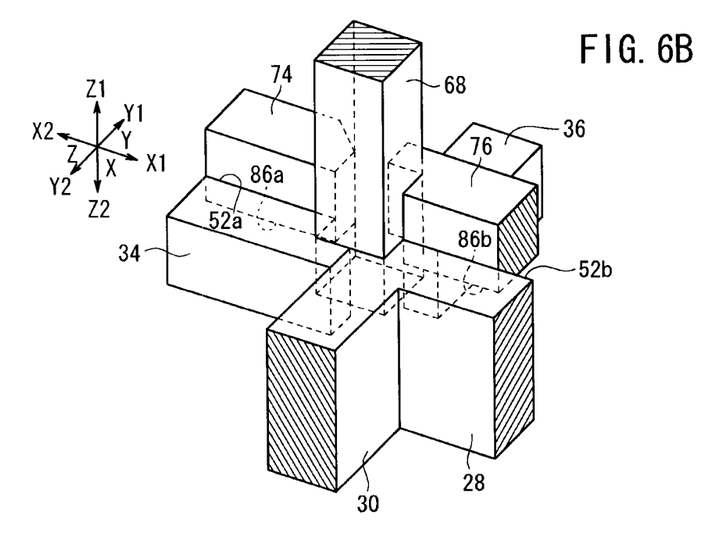
FIG. 6B is an explanatory view showing the positional relation between a first upper blade and a first lower blade after the plate is cut.

Then, when the upper die 16 is moved downward further, the plate 12 is subjected to a cutting force, since a pressing force of the first divided upper blades 86a and 86b and a repulsive force of the first divided lower blades 52a and 52b act thereon. As a result, as shown in FIG. 6B, the plate is cut in the X direction. In FIG. 6B, the plate 12 is not shown, and the positional relationship between the moving section 70 and the movable section 24 when the first cutting line C1 is cut is shown.

In step S3, the common blades 54 and 88 punch the plate 12 before the first divided blades 52 and 56 cut the plate 12. Therefore, it is possible to prevent the plate 12 from being held by the boundary between the common blades 54 and 88 and the first divided blades 52 and 56.

In sequence, the controller 18 drives the press mechanism so as to move the upper die 16 upwards (step S4) and to carry the plate 12 a predetermined distance in the carrying direction (step S5).

In addition, the controller 18 is switched from the first mode to the second mode (step S6). Specifically, the first cylinder controller 108 drives the first drive cylinder 94, thereby moving the slide plate 92 in the X1 direction, and the second drive cylinder controller 110 drives the second drive cylinder 96, thereby moving the slide plate 92 in the Y2 direction.

When the slide plate 92 is moved in the X1 direction, the first flat surface 102a and the second flat surface 104a are released from the contact state (switched into non-contact state). Due to an urging force of the guide member 98 in the Z1 direction, the first inclined surface 102b and the second inclined surface 104b are brought into contact with each other, and the first and second moving sections 74 and 76 are moved in the Z1 direction.

Figure 7A:
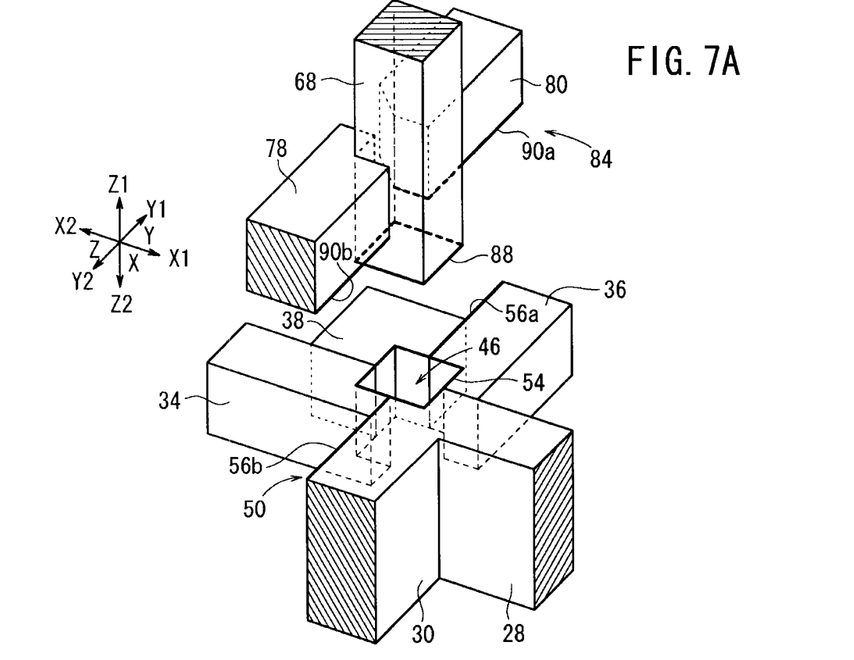
FIG. 7A is an explanatory view showing the positional relation between a second upper blade and a second lower blade before a plate is cut.

In addition, when the slide plate 92 is moved in the Y2 direction, in the third and fourth displacement-regulating sections 100c and 100d, the first engaging member 102 is pressed in the Z2 direction and moved downward in the state in which the first inclined surface 102b and the second inclined surface 104b are in contact with each other. Here, the force of pressing the first engaging member 102 is greater than the urging force of the guide section 98. Accordingly, as shown in FIG. 7A, the third and fourth moving sections 78 and 80 are positioned closer to the lower die than the first and second moving sections 74 and 76 are. That is, the first mode is switched into the second mode. In FIG. 7A, the first and second moving sections 74 and 76 are not shown.

The width of the second engaging member 104 is set to be wider than that of the first engaging member 102. Thus, for example, when the first cylinder 94 is being driven, in the third and fourth displacement-regulating sections 100c and 100d, it is possible to prevent the contact between the first inclined surface 102b and the second inclined surface 104 from being released from each other.

Afterwards, the controller 18 drives the press mechanism, thereby moving the upper die 16 downward (step S7). Then, the second cutting line C2 of the plate 12 is cut (see FIG. 8). Since the principle in which the second cutting line C2 of the plate 12 is the same as the principle in which the first cutting line C1 of the plate 12, a brief description will be given of the cutting of the cutting line C2 of the plate 12.

Figure 7B:
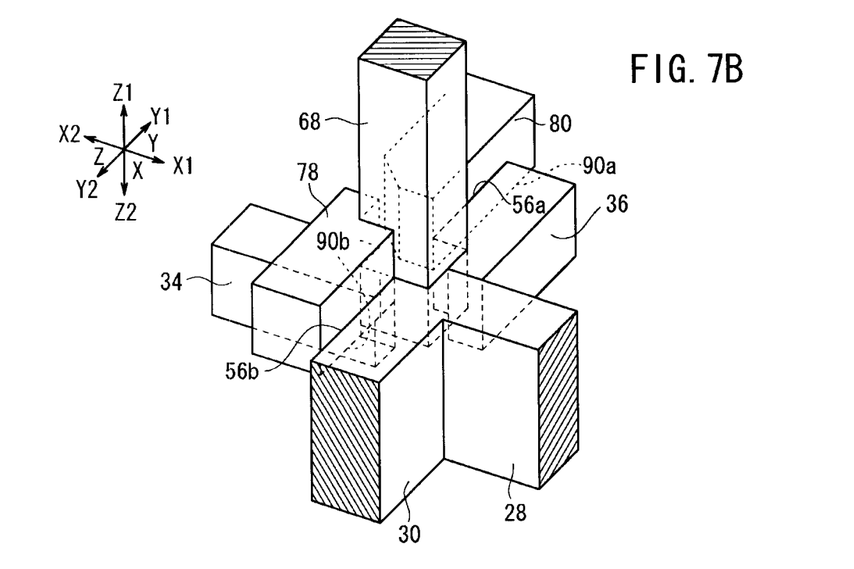
FIG. 7B is an explanatory view showing the positional relation between a second upper blade and a second lower blade after the plate is cut.

First, when the upper die 16 is moved downward, the plate 12 is punched into the shape of a rectangle by the punch section 68. As the upper die 16 is moved downward further, the plate 12 is subjected to a cutting force, since a pressing force of the second divided upper blades 90a and 90b and a repulsive force of the second divided lower blades 56a and 56b act thereon. As a result, as shown in FIG. 7B, the plate 12 is cut in the Y direction. In FIG. 7B, the plate 12 is not shown, and the positional relationship between the moving section 70 and the movable section 24 when the second cutting line C2 is cut is shown.

In sequence, the controller 18 drives the press member, thereby moving the upper die upward (step S8). Afterwards, this cutting sequence is completed.

Figure 8:
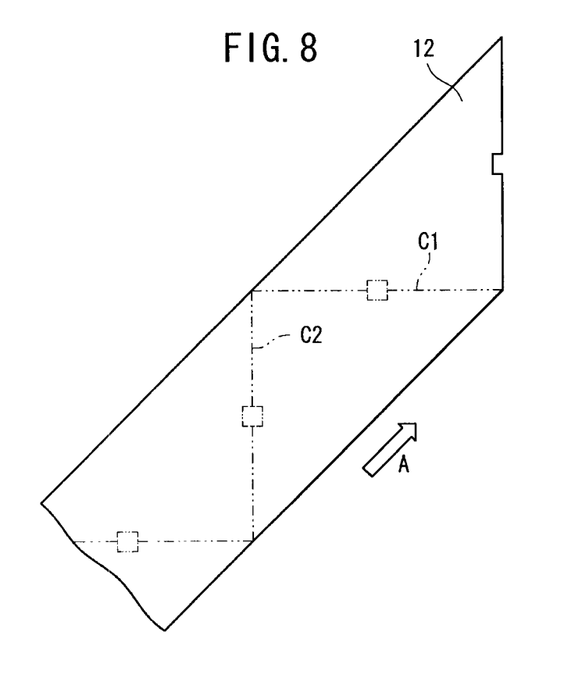
FIG. 8 is a top plan view of the plate to be cut by the cutting apparatus according to an exemplary embodiment of the invention.

According to the foregoing cutting sequence, as shown in FIG. 8, the plate 12 can be roughly cut into substantially the shape of a triangle. Accordingly, it is possible to fabricate parts, such as a side panel for vehicles, by performing a predetermined machining process on the plate 12, which is roughly cut.

According to an embodiment of the invention, the cutting apparatus includes the first blades 48 and 82, the second blades 50 and 84 intersecting the first blades 48 and 82, and a switching unit 72, which switches between the first mode, in which the first blades 48 and 82 are disposed in the cutting position in which the work-piece 12 can be cut and the second blades 50 and 84 are disposed in the non-cutting position in which the work-piece 12 cannot be cut, and the second mode, in which the second blades 50 and 84 are disposed in the cutting position in which the work-piece 12 can be cut and the first blades 48 and 82 are disposed in the non-cutting position in which the work-piece 12 cannot be cut.

According to this cutting apparatus, since the first blade 82 and the second blade 84 intersect each other, the size of the cutting apparatus 10 can be further decreased than the case in which the die is configured such that the first upper blade and the second blade are separated from each other. In addition, it is possible to use the first upper blade 82 and the second upper blade 84 so that the first and lower upper blades 82 and 84 are discriminated from each other, by switching between the first mode and the second mode. Therefore, even when the interval between the first cutting line C1 and the second cutting line C2 is wide, it is possible to efficiently decrease the size of the cutting apparatus 10.

In addition, the common blade, which belongs to both the first blade and the second blade, may be provided at the point where the first and second blades intersect each other, and the first and second blades may be divided from each other in the common blade.

In this way, since the common blade is provided at the point where the first blade and the second blade intersect each other, the first mode can be realized by disposing the divided blades of the first blade (first divided blades) and the common blade are disposed in the cutting position and by disposing the divided blades of the second blade (second divided blades) in the non-cutting position. Likewise, the second mode can be realized by disposing the second divided blades and the common blades in the cutting position.

In addition, the common blade may punch the work-piece before the divided blades of the first blade or the second blade cut the work-piece.

In this way, it is possible to prevent the plate is held by the boundary between the common blade and the divided blades, since the common blade punches the work-piece the first divided blades or the second divided blades cut the work-piece.

The foregoing exemplary embodiment may be variously changed. The punch section is not limited to the example in which the punch section has the rectangular cross-section. The punch section may be configured such that the punch section has a polygonal or circular cross-section or is hollow. In this case, the through-hole is formed so as to conform to the shape of the punch section. When the punch section is formed so as to be hollow, the weight of the upper die can be decreased.

The present invention is not limited to the foregoing exemplary embodiment, but can, of course, employ a variety of configurations without departing from the concept of the invention.

The cutting apparatus of the present invention is not limited to the example in which the cutting apparatus cuts a plate having two types of cutting lines, but can be configured such that the cutting apparatus can cut a plate having three or more types of cutting lines. In this case, it is preferred that the upper blades, each of which has the same shape as that of each cutting line, be disposed in the upper die such that the upper blades intersect each other.

DESCRIPTION OF REFERENCE NUMERALS

10 . . . Cutting Apparatus
12 . . . Plate (Work-piece)
14 . . . Lower die
16 . . . Upper die
48 . . . First lower blade
50 . . . Second lower blade
52a, 52b . . . First divided lower blade
54 . . . Common lower blade
56a, 56b . . . Second divided lower blade
82 . . . First Upper blade
84 . . . Second Upper blade
86a, 86b . . . First divided upper blade
88 . . . Common blade
90a, 90b . . . Second divided upper blade

The invention claimed is:

1. A cutting apparatus comprising:
a lower die to which a work-piece is mounted and an upper die movable toward the lower die;
a first blade including a plurality of first divided blades;
a second blade including a plurality of second divided blades;
a common blade disposed where the first blade and the second blade intersect with each other in a plan view, the common blade being configured to punch the work-piece and being disposed adjacent to the first divided blades and the second divided blades; and
a switching unit adapted to conduct a switching between a first mode in which the plurality of first divided blades are positioned in a cutting position in which it is possible to cut the work-piece and the plurality of second divided blades are positioned in a non-cutting position in which it is impossible to cut the work-piece and a second mode in which the plurality of second divided blades are positioned in the cutting position in which it is possible to cut the work-piece and the plurality of first divided blades are positioned in the non-cutting position in which it is impossible to cut the work-piece,
wherein the first blade is a first lower blade provided on the lower die and a first upper blade provided on the upper die in a position corresponding to the first lower blade, the second blade is a second lower blade provided on the lower die and a second upper blade provided on the upper die in a position corresponding to the second lower blade, and the common blade is a common lower blade provided on the lower die and a common upper blade provided on the upper die in a position corresponding to the common lower blade.

2. The cutting apparatus of claim 1, wherein the common blade is adapted to punch the work-piece before the first divided blades or the second divided blades cut the work-piece.

3. The cutting apparatus of claim 1, wherein the lower die includes a fixing section and a movable section movable toward the upper die, the first lower blade and the second lower blade provided on one end of the fixing section and on one end of the movable section.

4. The cutting apparatus of claim 1, wherein the common lower blade connects first divided lower blades to each other.

5. The cutting apparatus of claim 1, wherein the common upper blade connects first divided upper blades to each other.

* * * * *